United States Patent Office 2,716,627
Patented Aug. 30, 1955

2,716,627

1-ARYL DERIVATIVES OF 2-NITROISOPROPYL-PHENYLALKANES AND INSECTICIDAL COMPOSITIONS CONTAINING THE SAME

Arnold N. Johnson, Passaic, N. J., assignor to Commercial Solvents Corporation, Terre Haute, Ind., a corporation of Maryland No Drawing. Application October 12, 1953, Serial No. 385,695

16 Claims. (Cl. 167—30)

My invention relates to insecticidal compositions and is particularly concerned with materials adapted for combatting flies, the southern army worm, the Mexican bean beetle, and other common insect pests. More particularly it relates to 1-aryl derivatives of 2-nitro-1-p-isopropylphenylalkanes having the general formula:

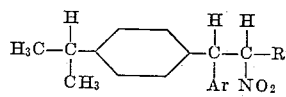

wherein R is an alkyl chain selected from the group consisting of methyl and ethyl and Ar is selected from the group consisting of tolyl, xylyl, ethylphenyl, diethylphenyl, and isopropylphenyl.

Nearly all the practical insecticides now known to the art suffer from serious disadvantages, among the most serious of which is the fact that they are highly selective in their action. This means that the choice of an insecticide must be governed by the particular insect pest against which it is to be used. Certain insects are virtually immune to all known insecticides when applied in economically feasible quantities. Moreover, certain species of insects have been shown to develop strains highly resistant to specific insecticides, such as flies resistant to 1,1,1-trichloro-2,2-bis-(p-chlorophenyl)ethane. This development of strains resistant to certain highly chlorinated insecticides sometimes results in the production of strains showing increased resistance to all types of highly chlorinated insecticides.

Further disadvantages frequently prevent an insecticidal agent with adequate killing properties from being used commercially. The agent may, for example, produce a discoloration of, or impart a taste to the infested vegetable or animal, thus rendering it unsuitable for market. Also, the agent may be difficult to apply or dangerous both during and after application. The cost of many insecticidal agents is also a prohibitive disadvantage. Another disadvantage directly related to that of high cost is that many agents must be applied in relatively strong concentrations. As a general rule it may be stated that the lower the required toxic concentration the lower the cost of using an insecticidal agent.

For the reasons set forth above and others, there has long been a desire for insecticides containing no halogen, thus avoiding the halogen resistance which may be developed and the tendency of the halogen to give compounds containing it particularly strong tastes and odors. Such non-halogenated insecticides, however, must be substantially as effective as the chlorinated insecticides to be economically practicable.

I have now discovered that compounds having the general formula:

wherein R is selected from the group consisting of methyl and ethyl and Ar is selected from the group consisting of tolyl, xylyl, ethylphenyl, diethylphenyl, and isopropylphenyl, possess strong insecticidal properties although they contain no halogen; and in particular that these compounds are especially effective agents for the Mexican bean bettle, housefly, the southern army worm, and the pea aphid. I have also discovered that not only do my compounds produce a high per cent kill against a variety of insects but they also produce a high per cent kill in such low concentrations as to make the use of my compounds economically desirable.

My invention comprises compounds resulting from the condensation reaction in the presence of concentrated sulfuric acid of 2-nitro-1-p-isopropylphenyl-1-alkanols with certain alkylbenzenes. Examples of my new compounds include 2 - nitro - 1 - p - isopropylphenyl - 1- p - ethylphenylpropane, 2 - nitro - 1 - p - isopropylphenyl - 1 - p-ethylphenylbutane, 2-nitro-1-p-isopropylphenyl-1-p-tolylpropane, 2-nitro-1-p-isopropylphenyl-1-p-tolylbutane, 2-nitro-1-p-isopropylphenyl-1-xylylpropane, 2-nitro-1-p-isopropylphenyl-1-xylylbutane, 2-nitro-1-p-isopropylphenyl-1-diethylphenylpropane, 2-nitro-1-p-isopropylphenyl-1-diethylphenylbutane, 2-nitro-1,1-bis-(p-isopropylphenyl)-propane and 2-nitro-1,1-bis-(p-isopropylphenyl)butane.

Generally, in the preparation of my new compounds, I prefer to introduce into a reaction vessel a mixture of the concentrated sulfuric acid with an inert solvent, such as carbon tetrachloride, and slowly add the alkylbenzene and 2-nitro-1-p-isopropylphenyl-1-alkanol as a mixture in order to suppress possible side reactions between the alkylbenzene and the sulfuric acid. After the reaction is completed I allow the mixture to settle, separate the resulting layers, steam distill the top layer, and dry the residue to obtain my new product.

The sulfuric acid employed as a condensation agent can vary in concentration from about 80% to about 98% without appreciably affecting the yield of the desired product. The reaction will proceed at temperatures ranging from about 5° to about 50° C. However, I prefer to conduct the reaction at from about 15° to about 30° C. to minimize side reactions.

As starting materials for my new compounds I can employ the 2-nitro-1-p-isopropylphenyl-1-alkanols such as 2-nitro-1-p-isopropylphenyl-1-propanol and 2-nitro-1-p-isopropylphenyl-1-butanol and an alkyl substituted benzene such as ethylbenzene, toluene, xylene, isopropylbenzene and diethylbenzene.

The 2-nitro-1-p-isopropylphenyl-1-butanol used in producing certain of my compounds can be prepared by condensing p-isopropylbenzaldehyde with 1-nitropropane. A convenient method of effecting this condensation is as follows: A mixture of 3 moles of 1-nitropropane and 1 mole of p-isopropylbenzaldehyde was agitated for 4 hours at 20° C. after the slow addition of 0.2 mole of 3.7 N alcoholic potassium hydroxide. The mixture was then acidified with 25% sulfuric acid to a pH of 2. Excess 1-nitropropane and unreacted p-isopropylbenzaldehyde were then removed by steam distillation, and the water layer separated from the product. If the pH is much above 2, appreciable aldehyde appears in the distillate and lowers the yield of 2-nitro-1-p-isopropylphenyl-1-butanol. The 2-nitro-1-p-isopropylphenyl-1-propanol can be prepared in the same manner as that outlined above by substituting nitroethane for the 1-nitropropane utilized in the first step.

The compounds of my invention are not uniformly toxic to different insects. Thus, the least quantity of my compound which can be used effectively in insecticidal compositions depends primarily on the particular insect to be combatted. The required concentration also depends to some extent on such factors as the carrier used, method of application, location of insects and effect of the toxicant on host plants or animals. In general, however, compositions containing from about 0.5% to about 5% by weight in a liquid carrier give excellent results. For many common insect pests, concentrations much lower than 0.5% can be used. A 0.1% concentration of any one of my new compounds is sufficient to give a 100% kill when tested on Mexican bean beetles, houseflies, and pea aphids, insects against which many commonly used agricultural insecticides are ineffective, and concentrations as low at .005% will give kills of less than 100% on Mexican bean beetles and pea aphids. Concentrations as high as 5% may sometimes be desirable, but the toxic effects on the host plant or animal must be considered when using such concentrations.

Many different insecticidal carriers may be used for my new compounds. Effective concentrations can be produced in liquid carriers such as the lower aliphatic alcohols (methyl, ethyl, propyl, butyl), chlorinated hydrocarbons (carbon tetrachloride, dichloromethane, chloroform), and coal distillation solvents (benzene, xylene, toluene). Household kerosene can be used for the carrier or ultrasene, deodorized kerosene, can be substituted if the odor of kerosene is undesirable. Aqueous emulsions can be made and are advantageous in some cases. As a solid vehicle, I can employ any of the forms of powdered silicates which are commonly employed in insecticidal compositions, such as pyrophyllite, bentonite, fuller's earth, kieselguhr, kaolin and talc.

In addition to either a liquid or solid carrier, other killing agents may be combined with my new compounds. In general, my compounds can be used in conjunction with killing agents such as pyrethrum, rotenone, derris extract, nicotine, and organic thiocyanates.

The following specific examples are offered to illustrate my invention and it is not intended that my invention be limited to the specific amounts and proportions set forth therein.

EXAMPLE I

In a beaker was placed 595 g. of 90% sulfuric acid and 350 ml. of carbon tetrachloride. A mixture of 329 grams (3.1 moles) of ethylbenzene and 364.5 grams (1.425 moles) of 2-nitro-1-p-isopropylphenyl-1-butanol was added dropwise with agitation, maintaining the temperature during the addition between 5° and 15° C. The resulting mixture was agitated for 2 hours then allowed to settle. The resulting two layers were separated, and the top layer was washed with dilute sodium bicarbonate solution and steam distilled. Upon drying the residue with chloroform under a vacuum, 379.3 grams (1.165 moles) of 2-nitro-1-p-isopropylphenyl-1-p-ethylphenylbutane was obtained. The 379.3 grams of viscous oily product represented a yield of 82.5% of theoretical.

Insecticidal compositions containing the above crude product was formulated as emulsifiable solutions in xylene at the concentrations shown in Table I below. Houseflies were sprayed and retained in 14 mesh stainless steel cages. Dorsal and ventral surfaces of Wood Prolific Lima beans were sprayed for 10 seconds each and offered to southern army worm larvae, Mexican bean beetle larvae and pea aphids. The insecticidal compositions were applied with a Water's spray tower operated at 10 pounds per square inch and 10 seconds at the rate of 26 ml. discharge per minute. Table I below shows the per cent kill obtained on the various insects using different dilutions of the insecticides.

Table I 50 houseflies—24 hour test period
10 Mexican bean beetle larvae—48 hour test period
10 southern army worm larvae—48 hour test period
10 pea aphids—48 hour test period

| Dilution, Percent | Percent Kill in Period | | | |
| --- | --- | --- | --- | --- |
| | House-fly | Mexican Bean Beetle | Southern Army Worm | Pea Aphid |
| 1.0 | 100 | 100 | 100 | 100 |
| 0.1 | 100 | 100 | 80 | 100 |
| 0.05 | 74 | 100 | 70 | 100 |
| 0.01 | 0 | 100 | 0 | 100 |
| 0.005 | 0 | 80 | 0 | 80 |

EXAMPLE II

In a 400-ml. beaker were mixed 50 ml. of 96% sulfuric acid and 100 ml. of carbon tetrachloride. To this mixture was added by dropwise addition over a 35 minute period a mixture of 27.0 grams (0.114 mole) of 2-nitro-1-p-isopropylphenyl-1-butanol and 30.8 grams (0.257 mole) of isopropylbenzene. After additional agitation for 1 hour the resulting layers were separated, the top layer washed with water, and steam distilled. After drying with chloroform and by vacuum the residue constituted 22.9 grams (0.0678 mole) of 2-nitro-1,1-bis-(p-isopropylphenyl)butane which represented a yield of 59.5% of theoretical.

Insecticidal compositions containing the above product were then formulated and applied to houseflies, Mexican bean beetle larvae, southern army worm larvae, and pea aphids in the manner described in Example I. The results are shown in Table II below.

Table II 50 houseflies—24 hour test period
10 Mexican bean beetle larvae—48 hour test period
10 southern army worm larvae—48 hour test period
10 pea aphids—48 hour test period

| Dilution, Percent | Percent Kill in Period | | | |
| --- | --- | --- | --- | --- |
| | House-fly | Mexican Bean Beetle | Southern Army Worm | Pea Aphid |
| 1.0 | 100 | 100 | 100 | 100 |
| 0.1 | 100 | 100 | 100 | 90 |
| 0.05 | 100 | 100 | 80 | 90 |
| 0.01 | 0 | 100 | 0 | 70 |
| 0.005 | 0 | 100 | 0 | 10 |

EXAMPLE III

To a cold mixture of 163.5 g. of 90% sulfuric acid and 80 ml. of carbon tetrachloride there was added by dropwise addition with agitation a mixture of 80.0 g. (0.36 mole) of 2-nitro-1-p-isopropylphenyl-1-propanol and 76.5 g. (0.72 mole) of ethylbenzene. The temperature was maintained at from 5° to 15° C. during the addition. After additional agitation for 1 hour the resulting layers were separated, the top layer washed with dilute sodium bicarbonate solution, and steam distilled. After drying with benzene and by vacuum the residue constituted 66.9 g. (0.215) mole) of 2-nitro-1-p-isopropylphenyl-1-p-ethylphenylpropane. The 66.9 g. of mobile oil represented a yield of 60% of theoretical.

Insecticidal compositions containing the above product were then formulated and applied to houseflies, Mexican bean beetle larvae, and pea aphids in the manner described in Example I. The results are shown in Table III below.

Table III 50 houseflies—24 hour test period
10 Mexican bean beetle larvae—48 hour test period
10 pea aphids—48 hour test period

| Dilution, Percent | Percent Kill in Period | | |
|---|---|---|---|
| | Housefly | Mexican Bean Beetle | Pea Aphid |
| 0.1 | 100 | 100 | 100 |
| 0.05 | 98 | 100 | 100 |
| 0.01 | 0 | 40 | 70 |
| 0.005 | 0 | 0 | 20 |

EXAMPLE IV

To a cold mixture of 163.5 g. of 90% sulfuric acid and 80 ml. of carbon tetrachloride there was added by dropwise addition with agitation a mixture of 80 g. (0.32 mole) of 2-nitro-1-p-isopropylphenyl-1-butanol and 92.1 g. (1.0 mole) of toluene. The temperature was maintained at from 5° to 15° C. during the addition. After additional agitation for 1 hour the resulting layers were separated, the top layer washed with dilute sodium bicarbonate solution, and steam distilled. After drying with benzene and by vacuum the residue constituted 82.6 g. (0.265 mole) of 2-nitro-1-p-isopropylphenyl-1-tolylbutane. The 82.6 g. of viscous oil represented a yield of 83% of theoretical.

Insecticidal compositions containing the above product were formulated and applied to houseflies, Mexican bean beetle larvae, southern army worm larvae, and pea aphids in the manner described in Example I. The results are shown in Table IV below.

Table IV 50 houseflies—24 hour test period
10 Mexican bean beetle larvae—48 hour test period
10 southern army worm larvae—48 hour test period
10 pea aphids—48 hour test period

| Dilution, Percent | Percent Kill in Period | | | |
|---|---|---|---|---|
| | Housefly | Mexican Bean Beetle | Southern Army Worm | Pea Aphid |
| 0.1 | 100 | 100 | 100 | 100 |
| 0.05 | 100 | 100 | 40 | 90 |
| 0.01 | 0 | 90 | 0 | 60 |
| 0.005 | 0 | 20 | 0 | 40 |

EXAMPLE V

To a cold mixture of 163.5 g. of 90% sulfuric acid and 80 ml. of carbon tetrachloride there was added by dropwise addition with agitation a mixture of 80 g. (0.32 mole) of 2-nitro-1-p-isopropylphenyl-1-butanol and 106.2 g. (1.0 mole) of xylene. The temperature was maintained at from 5° to 15° C. during the addition. After additional agitation for 1 hour the resulting layers were separated, the top layer washed with dilute sodium bicarbonate solution, and steam distilled. After drying with benzene and by vacuum the residue constituted 88.7 g. (0.273 mole) of 2-nitro-1-p-isopropylphenyl-1-xylylbutane. The 88.7 g. of viscous oil represented a yield of 85% of theoretical.

Insecticidal compositions containing the above product were formulated and applied to houseflies, Mexican bean beetle larvae, southern army worm larvae, and pea aphids in the manner described in Example I. The results are shown in Table V below.

Table V 50 houseflies—24 hour test period
10 Mexican bean beetle larvae—48 hour test period
10 southern army worm larvae—48 hour test period
10 pea aphids—48 hour test period

| Dilution, Percent | Percent Kill in Period | | | |
|---|---|---|---|---|
| | Housefly | Mexican Bean Beetle | Southern Army Worm | Pea Aphid |
| 0.1 | 90 | 100 | 60 | 100 |
| 0.05 | 50 | 100 | 0 | 70 |
| 0.01 | 0 | 20 | 0 | 40 |

While the above examples described the preferred embodiments of my invention, it will be understood that departures therefrom may be made within the scope of the specification and claims. In general it may be said that any modifications or equivalents that would ordinarily occur to those skilled in the art are to be considered as lying within the scope of my invention.

Now having disclosed my invention what I claim is:

1. The compounds represented by the formula:

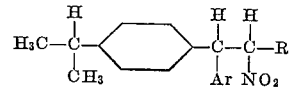

wherein R is selected from the group consisting of methyl and ethyl and Ar is selected from the group consisting of tolyl, xylyl, ethylphenyl and isopropylphenyl.

2. 2 - nitro - 1 - p - isopropylphenyl - 1 - p - ethyl - phenyl-butane.
3. 2 - nitro - 1,1 - bis - (p - isopropylphenyl)butane.
4. 2 - nitro - 1 - p - isopropylphenyl - 1 - p - ethyl - phenylpropane.
5. 2 - nitro - 1 - p - isopropylphenyl - 1 - tolylbutane.
6. 2 - nitro - 1 - p - isopropylphenyl - 1 - xylylbutane.
7. An insecticidal composition containing as the active insecticidal component thereof a compound represented by the formula:

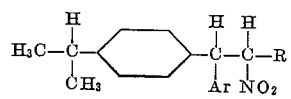

wherein R is selected from the group consisting of methyl and ethyl and Ar is selected from the group consisting of tolyl, xylyl, ethylphenyl and isopropylphenyl.

8. The composition of claim 7 wherein the active insecticidal component thereof is dispersed in a liquid petroleum distillate as a carrier.
9. The composition of claim 7 wherein the active insecticidal component thereof is dispersed in a liquid coal tar hydrocarbon as a carrier.
10. The composition of claim 7 wherein the active insecticidal component thereof is contained in a powdered silicate as a carrier.
11. An insecticidal composition containing as the active insecticidal component thereof from 0.005% to 5% of a compound represented by the formula:

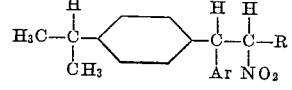

wherein R is selected from the group consisting of methyl and ethyl and Ar is selected from the group consisting of tolyl, xylyl, ethylphenyl, and isopropylphenyl.

12. An insecticidal composition containing as the active insecticidal component thereof from 0.005% to 5% of 2-nitro-1-p-isopropylphenyl-1-p-ethylphenylbutane.

13. An insecticidal composition containing as the active insecticidal component thereof from 0.005% to 5% of 2-nitro-1,1-bis-(p-isopropylphenyl)butane.

14. An insecticidal composition containing as the active insecticidal component thereof from 0.01% to 5% of 2 - nitro - 1 - p - isopropylphenyl - 1 - p - ethylphenyl - propane.

15. An insecticidal composition containing as the active insecticidal component thereof from 0.005% to 5% of 2 - nitro - 1 - p - isopropylphenyl - 1 - tolylbutane.

16. An insecticidal composition containing as the active insecticidal component thereof from 0.01% to 5% of 2-nitro-1-p-isopropylphenyl-1-xylylbutane.

References Cited in the file of this patent

UNITED STATES PATENTS

| | | |
|---|---|---|
| 2,397,802 | Muller | Apr. 2, 1946 |
| 2,516,186 | Hass | July 25, 1950 |
| 2,653,896 | Hodge | Sept. 29, 1953 |